(12) United States Patent
Burke et al.

(10) Patent No.: US 12,499,259 B2
(45) Date of Patent: Dec. 16, 2025

(54) PERSONALLY IDENTIFIABLE INFORMATION COMPARISON TO DYNAMIC INDUSTRY STATE

(71) Applicant: Reltio, Inc., Redwood Shores, CA (US)

(72) Inventors: Michael Burke, Boston, MA (US); Jordan Hardy, San Diego, CA (US); Alexander Huitric, Goleta, CA (US); Nilesh Mishra, Santa Clara, CA (US); Manish Sood, Seattle, WA (US); Robin Sylvester, San Francisco, CA (US)

(73) Assignee: Reltio, Inc., Redwood Shores, CA (US)

( * ) Notice: Subject to any disclaimer, the term of this patent is extended or adjusted under 35 U.S.C. 154(b) by 205 days.

(21) Appl. No.: 18/212,109

(22) Filed: Jun. 20, 2023

(65) Prior Publication Data

US 2023/0409725 A1 Dec. 21, 2023

Related U.S. Application Data

(60) Provisional application No. 63/353,820, filed on Jun. 20, 2022.

(51) Int. Cl.
*G06F 21/62* (2013.01)
(52) U.S. Cl.
CPC .................. *G06F 21/6218* (2013.01)
(58) Field of Classification Search
CPC .......... G06F 21/6218; G06F 21/6254
See application file for complete search history.

(56) References Cited

U.S. PATENT DOCUMENTS

2023/0128136 A1\* 4/2023 Sahu .................. G06F 16/41
726/26

\* cited by examiner

*Primary Examiner* — Han Yang
(74) *Attorney, Agent, or Firm* — Ahmann Kloke LLP

(57) ABSTRACT

Among other techniques, techniques for providing feedback associated with personally identifiable information (PII) to a customer that is a member of an industry are described. The feedback includes a comparison with dynamic industry state. A system utilizing these techniques can include a continuous initially personally identifiable information (IPII) destruction engine; an IPII feature extraction engine coupled to the continuous IPII destruction engine; a bit labeling engine coupled to the continuous IPII destruction engine; a classified and interpreted IPII attribute instance bits datastore coupled to the bit labeling engine; and an auto-meta comparator feedback engine coupled to the classified and interpreted IPII attribute instance bits datastore. A method utilizing these techniques can include subdividing into affixes initially personally identifiable information (IPII) attribute instances of a first customer of a plurality of customers that are part of an industry; outputting bits corresponding to the IPII attribute instances; attaching labels to the bits, which are stored with metadata; and providing feedback to the first customer for the IPII attribute instances along with a dynamic auto-metadata comparison relative to dynamic industry state of the industry, wherein IPII attribute instances of the plurality of customers are used to update the dynamic industry state.

19 Claims, 1 Drawing Sheet

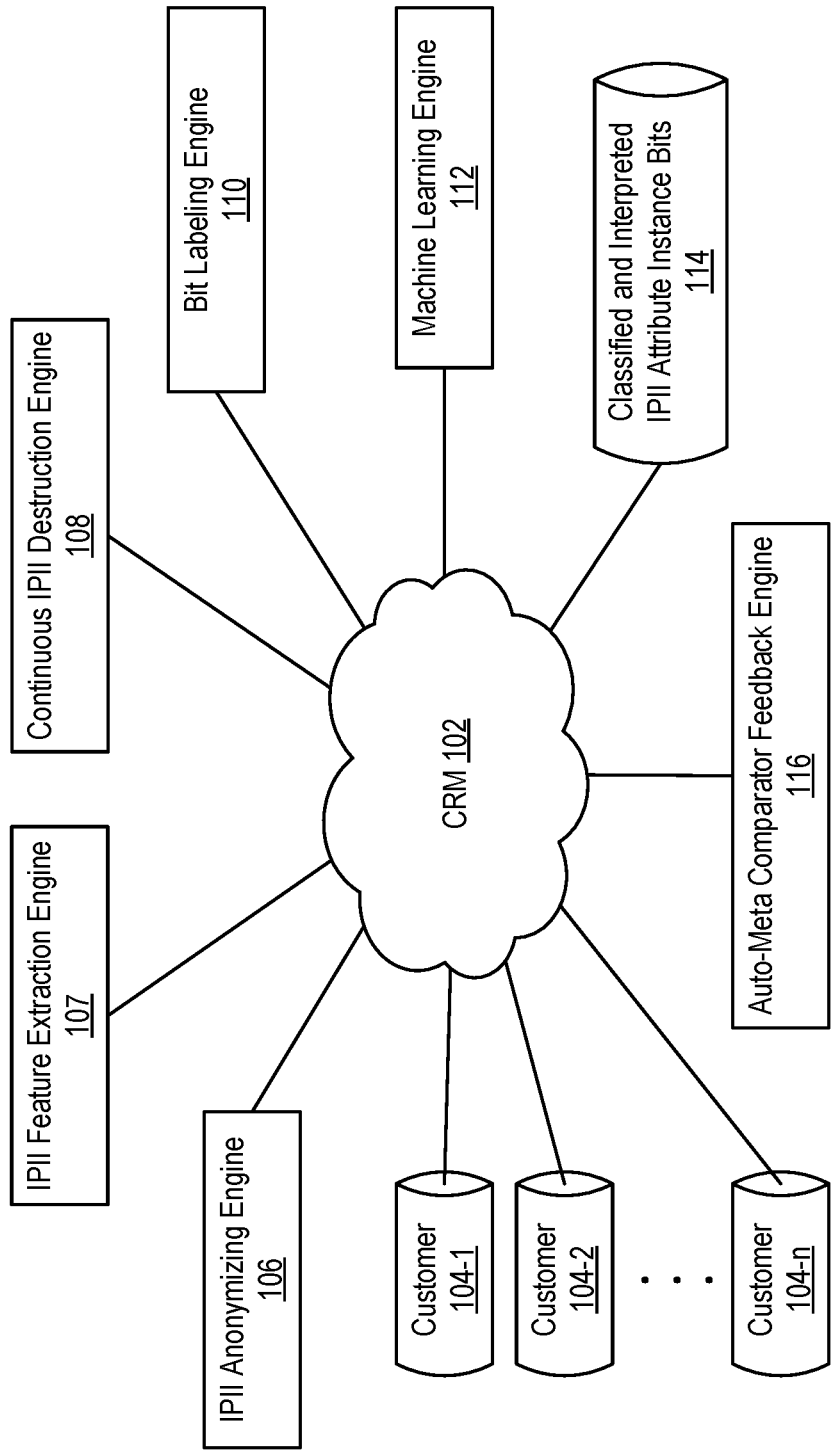

PERSONALLY IDENTIFIABLE INFORMATION COMPARISON TO DYNAMIC INDUSTRY STATE

CROSS-REFERENCE TO RELATED APPLICATIONS

The present application claims priority to U.S. Provisional Patent Application Ser. No. 63/353,820 filed Jun. 20, 2022, which is incorporated by reference herein.

BRIEF DESCRIPTION OF THE DRAWINGS

FIG. 1 is diagram of an example of an auto-meta comparator.

DETAILED DESCRIPTION

FIG. 1 is a diagram 100 of an example of an auto-meta comparator. The diagram 100 includes a computer readable medium (CRM) 102, customer datastore 104-1 to customer datastore 104-n (collectively, the customer datastores 104) coupled to the CRM 102, an initially personally identifiable information (IPII) anonymizing engine 106 (optional) coupled to the CRM 102, an IPII feature extraction engine 107 coupled to the CRM 102, a continuous IPII destruction engine 108 coupled to the CRM 102, a bit labeling engine 110 coupled to the CRM 102, a machine learning engine 112 coupled to the CRM 102, a classified and interpreted IPII attribute instance bits datastore 114 coupled to the CRM 102, and an auto-meta comparator feedback engine 116 coupled to the CRM 102.

The CRM 102 in intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g. "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations, while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

Referring once again to the example of FIG. 1, the customer datastores 104 include raw data from a plurality of customer systems. For the purposes of this example, the raw data can be characterized as IPII, which can include personally identifiable information (PII), a hash or other derived value of the PII, and data associated with the PII. To the extent customers desire to anonymize data, the customer datastores 104 could be preceded or followed by an anonymization engine that would hash or otherwise modify IPII prior to providing it to a system outside the control of the customer system. A hashing engine could also be used later in the process, such as at a system outside the control of the customer system, prior to feature extraction.

The IPII anonymizing engine 106 is an optional engine that is intended to anonymize data from the customer datastores 104. In a specific implementation, the IPII anonymizing engine is a hashing engine that converts PII attribute instances to IPII attribute instances. The IPII anonymizing engine 106 is optional because the system can be implemented such that PII is provided in the clear to the continuous IPII deconstruction engine 108. The IPII anonymizing engine 106 may or may not have a IPII de-anonymizing engine (not shown) at a server-side auto-metadata comparator. In an example that does not include a de-anonymizing engine, the auto-metadata comparator can perform the function described below using, e.g., hashed data that is never de-anonymized. It may be desirable or necessary for disparate systems to use a common hashing function (or the equivalent) to process anonymized PII from different customers, or for the system to at least be aware of how to process different hashes if the hashing functions are not the same.

The continuous IPII destruction engine 108 receives IPII attribute instances from the IPII anonymizing engine 106 (or from the customer datastores 104 if there is no IPII anonymizing engine 106). The continuous IPII destruction engine 108 is "continuous" because it receives a batch of IPII attribute instances from customers, which are digested to update what can be characterized as a dynamic industry state (e.g., a benchmark) for a customer that is part of a specified industry (or for a single industry if the auto-metadata comparator only considers one industry) and feedback is provided to the customer for the batch of IPII attribute instances, along with a dynamic auto-metadata comparison relative to batches of IPII attribute instances from other customers. The size of a "batch" of IPII attribute instances is implementation-, configuration-, or preference-specific. The initial dynamic industry state can be established from an initial nil value, a best guess, from datamining relevant datastores, from a training model, or in some other applicable manner.

The continuous IPII destruction engine 108 is intended to represent an engine that subdivides IPII attribute instances into prefixes, suffixes, and/or stems (collectively affixes). In a specific implementation, the IPII feature extraction engine 107 includes a plurality of microservices to enrich data. Advantageously, the continuous IPII destruction engine 108 can use IPII-aware microservices to provide micro-weights to common titles (e.g., Mr. or Dr.), hyphens, and/or special characters or strings (e.g., @, http, .com, to name several). Comparators assess affixes of each piece of IPII and output bits corresponding to the IPII. This can be colorfully characterized as "blowing the IPII to bits." The bits corresponding to IPII attribute instances, with micro-weight metadata, are passed to the bit labeling engine 110.

The bit labeling engine 110 receives raw data, bits, and metadata from the IPII destruction engine 108. In a specific implementation, labels are attached to bits during a training step. The bit labeling engine 110 can take advantage of ownership metadata and source system metadata. Knowledge of the customer from which IPII attribute instances are received enables association with data (customer-specific metadata) that is outside of the raw data. For example, an identity of a customer can be attached to bits, as can a time of receipt, a time of update, associated geocoordinates (that can assist in pinning down an address to a specific place even if the address is incomplete or uses different descriptors, such as apt. or suite), or the like. Knowledge of the source system from which IPII attribute instances are received enables association with a second kind of data (source system metadata) outside of the raw data. For example, metadata can include coding, text codes, information statistics, streaming rate, traffic characterizations (e.g., throughput), source (e.g., MAC or IP) address, update frequency, I/O (e.g., replication or rewriting). This additional data can be of utility for trying to offset (e.g., fraud, lineage, or the like). Addresses may receive special attention using a postal datastore (not shown) to assist with geolocation, zip code confirmation, address format verification, address-specific synonyms (e.g., apt. and suite) or the like.

The machine learning engine 112 is intended to represent an engine that runs the bits and metadata through a model. The machine learning engine 112 can be implemented as a neural net or using some other applicable machine learning technology, such as non-negative matrix factorization, T-distributed stochastic, and long short-term memory (LSTM), to name a few. In a specific implementation data and metadata are run through the model to obtain a classified label. Advantageously, IPII attribute instances are broken apart then statistics are run on rearranged data to find minimums, maximums, averages, freshness, and other characteristics or statistical information about IPII attribute instances.

The classified and interpreted IPII attribute instance bits datastore 114 is intended to represent the reassembled or sorted list of IPII attribute instances that are classified and interpreted bits.

The auto-meta comparator feedback engine 116 is intended to represent an engine that facilitates feedback to a customer with assessment of IPII compared to that of other customers and recommendations on how to improve data management. The auto-meta comparator feedback engine 116 can be incorporated (as a subengine) into a real-time (RT) landing for extract, transform, and load (ETL). The landing is RT because IPII attribute instances are reconsolidated and sorted in real time; the auto-meta comparator feedback (sub)engine 116 is responsible for providing auto-meta comparator feedback to the customer while a human or artificial agent of a customer is on the real-time landing for ETL.

Advantageously, the auto-meta comparator feedback engine 116 provides feedback that facilitates identifying uniqueness at industry level. A customer can compare email and fraud across an applicable industry, determine if something happens to a customer system that negatively impacts system performance (and what that something is), compare freshness (e.g., whether customer data is older than industry average), variance, proportion of names specific to nationality (e.g., many names are French), or the like. Feedback can include recommendations, such as updating email addresses, suggestions regarding how to amplify recommendations, and suggestions regarding how to get recommendations. The auto-meta comparator feedback can provide feedback related to data quality, such as how actions taken by customer agents impact quality, how recommendations improved quality, or the like.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made, and other embodiments may be used without departing from the broader scope of the present invention(s). Therefore, these and other variations upon the example embodiments are intended to be covered by the present invention(s).

What is claimed is:

1. A system comprising:
   one or more processors; and
   memory storing instructions that, when executed by the one or more processors, cause the system to perform:
   subdividing into affixes initially personally identifiable information (IPII) attribute instances of a first customer of a plurality of customers that are part of an industry:
   outputting bits corresponding to the IPII attribute instances;
   attaching labels to the bits, which are stored with metadata;
   providing feedback to the first customer for the IPII attribute instances along with a dynamic auto-metadata comparison relative to a dynamic benchmark, wherein IPII attribute instances of the plurality of customers are used to update the dynamic benchmark.

2. The system of claim 1, comprising a customer datastore that includes raw data from one or more customer systems, wherein the raw data includes one or more of personally identifiable information (PII), a hash or other derived value of the PII, and data associated with the PII.

3. The system of claim 1, wherein the instructions when executed by the one or more processors, cause the system to convert personally identifiable information (PII) attribute instances to the IPII attribute instances.

4. The system of claim 1, wherein the instructions when executed by the one or more processors, cause the system to convert the IPII attribute instances to personally identifiable information (PII) attribute instances.

5. The system of claim 1, wherein the instructions when executed by the one or more processors, cause the system to hash the IPII prior to feature extraction.

6. The system of claim 1, wherein the dynamic auto-metadata comparison is generated using the dynamic benchmark.

7. The system of claim 1, wherein the instructions when executed by the one or more processors, cause the system to subdivide the IPII attribute instances into affixes.

8. The system of claim 1, wherein the instructions when executed by the one or more processors, cause the system to use microservices to enrich data associated with the affixes.

9. The system of claim 1, wherein the instructions when executed by the one or more processors, cause the system to use IPII-aware microservices to provide micro-weights to specific data types, and wherein the metadata includes micro-weight metadata.

10. The system of claim 1, wherein the instructions when executed by the one or more processors, cause the system to assess the bits corresponding to the IPII attribute instances, the metadata, and raw data.

11. The system of claim 1, wherein the labels are attached to the bits during a training step.

12. The system of claim 1, wherein the instructions when executed by the one or more processors, cause the system to use ownership metadata and source system metadata.

13. The system of claim 1, wherein the instructions when executed by the one or more processors, cause the system to run the bits and the metadata through a model to obtain a classified label.

14. The system of claim 1, wherein the IPII attribute instances are broken apart and statistics are performed on rearranged data to locate minimums, maximums, averages, and freshness associated with the IPII attribute instances.

15. The system of claim 1, wherein the dynamic auto-metadata comparison is incorporated into a real-time (RT) landing for extract, transform, and loading (ETL).

16. The system of claim 1, wherein the instructions when executed by the one or more processors, cause the system to provide feedback that facilitates identifying uniqueness at industry level.

17. The system of claim 1, wherein the feedback includes recommendations, suggestions regarding how to amplify recommendations, and suggestions regarding how to get recommendations.

18. The system of claim 1, wherein the feedback relates to data quality.

19. A method comprising:
subdividing into affixes initially personally identifiable information (IPII) attribute instances of a first customer of a plurality of customers that are part of an industry;
outputting bits corresponding to the IPII attribute instances;
attaching labels to the bits, which are stored with metadata;
providing feedback to the first customer for the IPII attribute instances along with a dynamic auto-metadata comparison relative to a dynamic benchmark, wherein IPII attribute instances of the plurality of customers are used to update the dynamic benchmark.

* * * * *